June 7, 1960   O. EISELE   2,939,497
PORTABLE TRAVELING SAW AND CONTROL MEANS THEREFOR
Filed June 2, 1958   2 Sheets-Sheet 1
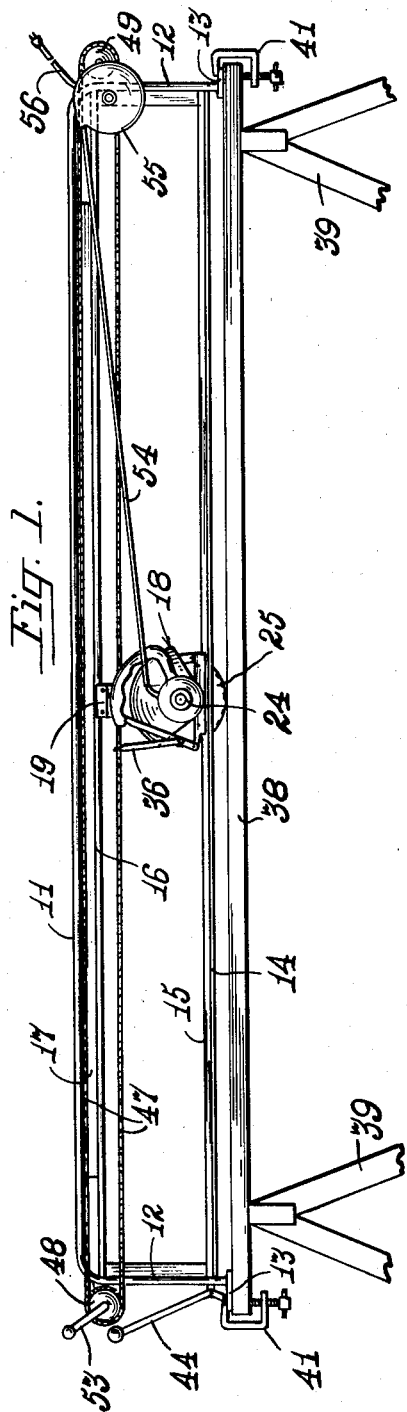
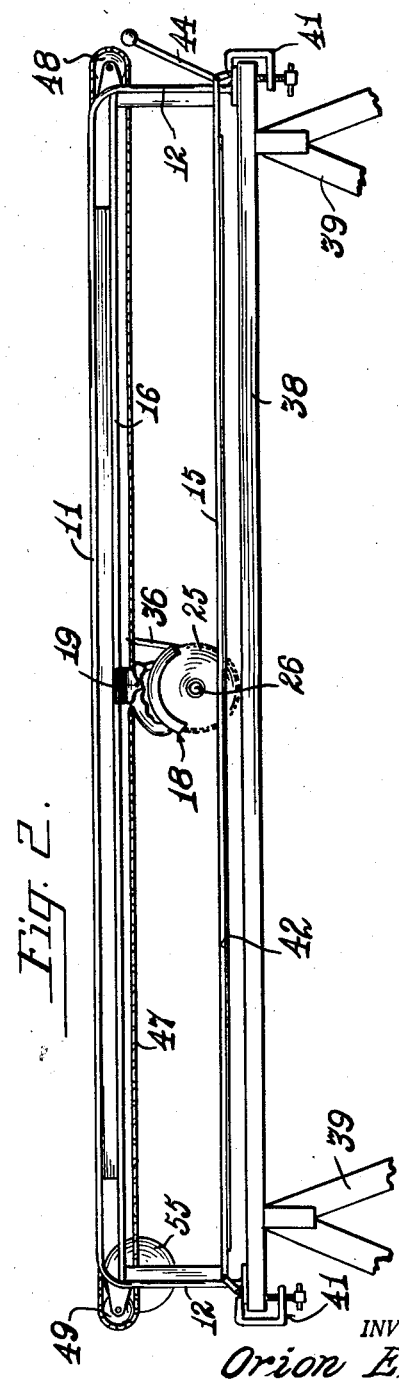
INVENTOR.
Orion Eisele June 7, 1960   O. EISELE   2,939,497
PORTABLE TRAVELING SAW AND CONTROL MEANS THEREFOR
Filed June 2, 1958   2 Sheets-Sheet 2
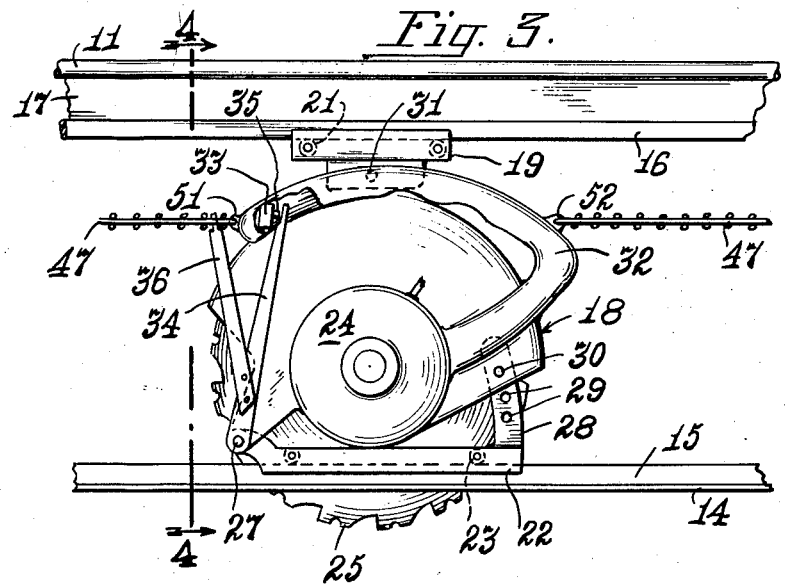
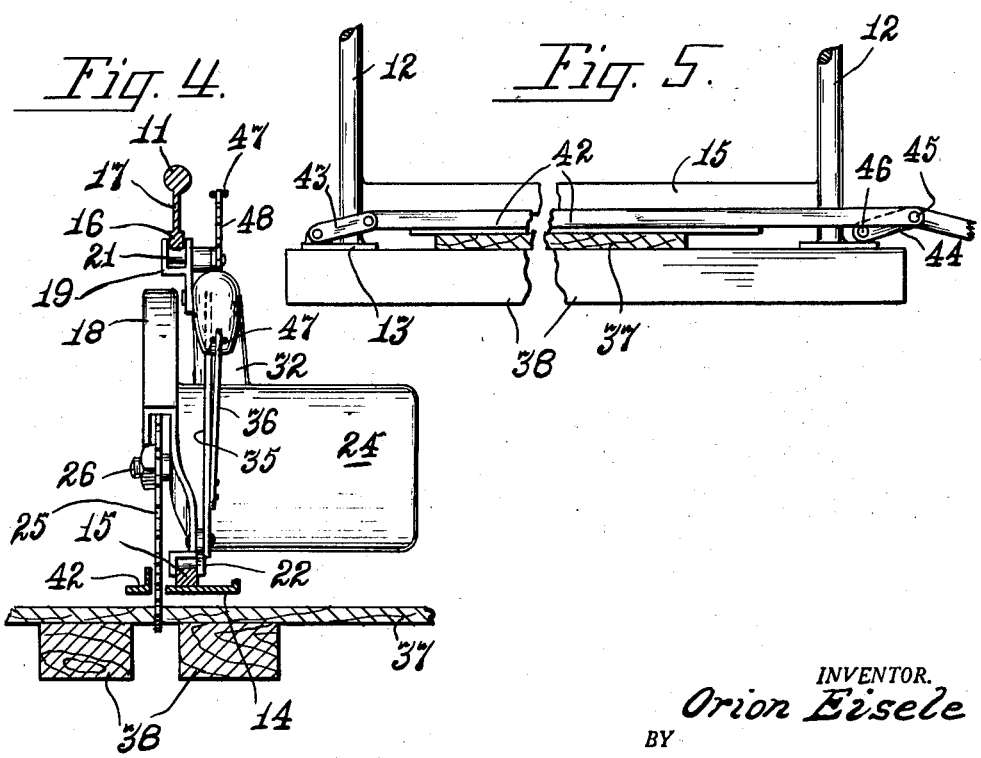
INVENTOR.
Orion Eisele

United States Patent Office 2,939,497
Patented June 7, 1960

2,939,497
PORTABLE TRAVELING SAW AND CONTROL MEANS THEREFOR

Orion Eisele, Aurora, Ill.; Johanna Mae Carey, administratrix of said Orion Eisele, deceased Filed June 2, 1958, Ser. No. 739,360

4 Claims. (Cl. 143—47)

The invention relates to improvements in traveling saws and more particularly to the novel construction and assembly of a portable power operated saw apparatus.

The apparatus disclosed herein comprises an elongated portable frame having longitudinal guides thereon along which a saw carriage mounting a power driven circular saw is arranged to travel. The saw carriage is suitably connected with manual means, operable from one end of the frame, for moving the saw carriage along the guides. The manual means is operably connected with control means, in the form of a switch in the electrical circuit to the motor, for actuating said control means only when the saw carriage is being advanced in one direction. The apparatus also includes novel means for clamping a sheet of material to be sawed in place beneath the frame and a rewind coil for the electric cord to the motor so as to avoid entanglement of the cord with the saw during use. The apparatus is self-contained and may be carried from job to job and be set up on a supporting frame easily and quickly and, when in use, is highly efficient and safe in operation.

It is therefore an object of the invention to provide a novelly constructed portable traveling saw.

Another object is to provide a novelly constructed frame for a traveling saw.

Another object is to provide a traveling power operated saw assembly that is easy to operate and wherein the operation of the saw is effected only when the saw is traveling in a cutting direction.

Another object is to provide a novelly constructed carriage for a traveling saw.

Another object is to provide a portable electrically driven saw with a novel rewind for the electrical cable.

Another object is to provide a portable power operated traveling saw assembly with a novel work clamp.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit, or sacrificing any of the advantages, of the invention.

For the purpose of facilitating an understanding of the invention, there is illustrated in the accompanying drawings, a preferred embodiment thereof, from an inspection of which, when considered in connection with the following description, the invention, its mode of construction, assembly and operation, and many of its advantages should be readily understood and appreciated.

Referring to the drawings in which the same characters of reference are employed to indicate corresponding or similar parts throughout the several figures of the drawings:

Fig. 1 is a front elevational view of the portable traveling saw assembly, showing it mounted on a supporting structure;

Fig. 2 is a back elevational view thereof;

Fig. 3 is an enlarged detail elevational view of the saw carriage assembly;

Fig. 4 is a transverse sectional view, taken substantially on line 4—4 of Fig. 3; and, Fig. 5 is a fragmentary detail elevational view of the frame, illustrating the clamp bar assembly.

Referring to the accompanying drawings, the portable traveling saw assembly comprises an elongated frame including an upper frame portion 11 having downwardly extending end portions 12 to each of which is secured, as by welding, a base plate 13. A thin strap 14 is arranged parallel to and in substantial vertical alignment with and below the upper portion 11, which strap has its ends secured, as by welding, to the end portions 12 above the base plates 13. Said strap has secured to its upper surface, and substantially coextensive therewith, a guide rail 15 that is substantially square in section. A companion guide rail 16 is arranged coextensive with the upper frame portion 11 and is connected thereto intermediate its ends by a web plate 17 and at its ends to the end portions 12.

A saw carriage 18, having an upper bearing bracket 19 fitted with anti-friction rollers 21, and a movable lower bearing bracket 22 fitted with anti-friction rollers 23, is mounted in the frame with the rollers in the respective bearing brackets 19—22 engaged with the guide rails 16 and 15 respectively, so as to be movable along substantially the entire length of the frame 11. This carriage 18 mounts an electric motor 24 having a circular saw 25 mounted on its driven shaft 26. As shown, the saw is so arranged that a segment of its perimeter overlies one side of the lower guide rail 15 and its mounting strap 14. Vertical adjustment of the saw carriage for varying the extent to which the periphery of the saw 25 projects below the strap 14 is effected by adjustment of the lower bearing bracket 22 with respect to the saw carriage.

As shown in Fig. 3, the lower bearing bracket 22 is pivotally secured to the saw carriage at one of its ends, as at 27, and its other end has an arcuate wing 28 formed with spaced perforations 29 to selectively receive a bolt 30 for securing said bearing bracket in a vertically adjusted position with respect to the saw carriage. In order to insure that the lower bearing bracket 22 is properly seated on the rail at all times, with both of its rollers 23 in engagement with said rail, the upper bearing bracket 19 is pivotally connected, as at 31, to the saw carriage 18 to facilitate self adjustment of the saw carriage irrespective of the relative position of the lower bearing bracket 22.

The saw carriage may include a hand-hold 32 which is hollow, at least in part, to receive mounted therein a normally open micro-switch 33 connected in the electrical circuit to the motor 24. A lever 34, pivotally mounted at the bearing 27, has its free end operatively associated with the spring detent 35 of the micro-switch for actuating the same. An arm 36, integral with or otherwise firmly secured to the lever 34, extends upwardly therefrom for a purpose to be explained presently.

As noted hereinabove, the saw carriage 18 is adapted to be moved longitudinally along the guides 15–16 during a cutting operation. In order to cut a piece of material, such as a sheet of plywood or wallboard 37, the elongated frame is placed in an upright position on a make-up support preferably comprised of at least two stringers 38, which may be 2 x 4's, laid upon a pair of saw-horses or other supports 39. C-clamps 41 engaged around the foot plates 13 and the related ends of the stringers 38 secure the frame firmly in place.

The sheet 37, to be cut, is then inserted in the space between the top surface of the stringers 38 and the bottom face of the frame strap 14, with the line of the proposed cut in vertical alignment with the path of the saw blade 25. The sheet 37 is held against displacement by a clamp bar 42 which is substantially coextensive with and is spaced laterally from one side of the guide rail 15, as best shown in Figs. 4 and 5. One end of the clamp bar 42 is connected to the frame by a link 43 (Fig. 5) and its other end is connected to an arm 44, as at 45, which arm has its lower end pivoted to the frame at 46. The arm 44 is movable from the substantially vertical position shown in Fig. 1, into and is held substantially in the inclined position shown in Fig. 5 so as to carry the clamp bar 42 down tightly against the sheet 37 for holding the same.

When the sheet 37 is properly positioned and clamped, the circular saw is placed in operation and moved longitudinally along the frame from one end of the sheet to the other. This is accomplished by manual operation of an endless chain 47 which is trained over a pair of sprockets 48-49 mounted for free rotation one on each of the end portions 12 of the frame. The lower reach of the chain 47 is fixedly connected to the saw carriage 18, as at 51-52 (Fig. 3), and rotation of the sprockets is effected by manual operation of an eccentric handle 53 (Fig. 1) on the sprocket 48.

Referring specifically to Fig. 3, the lower reach of the chain 47 is engaged with the switch lever arm 36. As a result, when the saw carriage 18 is moved to the left, as viewed in Fig. 3, the initial pull on the lower reach of the chain 47 causes the slack therein to be taken up and the arm 36 is moved sufficiently to depress the spring detent 35 for closing micro-switch 33 to start the motor. When the advance of the saw carriage 18 is stopped for any reason, or when the saw carriage is being returned to the starting end of the frame, the tension on the chain 47 is slackened sufficiently to permit the switch 33 to open, thus stopping motor operation. This arrangement insures utmost safety in the operation of the saw because it is idle at all times except when being advanced to perform a cutting operation.

In order to prevent entanglement of the electric supply cord 54 to the motor during the advance and retraction of the saw carriage 18 along the frame, said cord is carried on a spring wound drum mounted within a casing 55 located at one end of the frame and which has a supply line 56 extending therefrom for connection with a current supply source.

It is believed that the invention, its mode of construction and assembly, and many of its advantages should be readily understood from the foregoing without further description, and it should be manifest also that while a preferred embodiment of the invention has been shown and described for illustrative purposes, the structural details are nevertheless capable of wide variation within the purview of the invention as defined in the appended claims.

What is claimed and desired to secure by Letters Patent of the United States is:

1. In a saw, the combination of an elongated frame, vertically aligned upper and lower guide rails substantially coextensive with the length of said frame, a saw carriage, bearing brackets on said saw carriage one guided on each rail for movement longitudinally along the frame, said saw carriage mounting an electric motor and a circular saw blade connected to said motor, said blade having a peripheral portion extending below said frame to cut material arranged beneath the frame, a pair of sprockets one mounted at each end of the elongated frame, an endless chain trained over said sprockets, said chain having one reach thereof connected to said saw carriage, manually engageable means operable to rotate the sprockets to move the saw carriage along the rails, a normally open switch for said motor carried by the saw carriage, and a lever on said saw carriage engageable by said reach of the chain and operable to close said switch when the saw carriage is being advanced in a direction to cut the material.

2. In a saw, the combination of an elongated frame, upper and lower guide rails substantially coextensive with the length of said frame, a saw carriage, anti-friction means guiding said carriage along said rails for movement longitudinally along the frame, said saw carriage mounting an electric motor and a circular saw blade connected to said motor, means on said frame to support it spaced above a supporting surface, said blade having a peripheral portion extending below said frame to cut material arranged on said surface beneath said frame, manual means including an endless chain to advance the saw carriage longitudinally along said rails, a normally open switch on said saw carriage operable to start and stop the motor, and a lever carried by the saw carriage and operably connecting said chain with said switch actuable when the saw carriage is being advanced in a direction to cut said material to close the switch.

3. In a saw, the combination of an elongated frame, upper and lower guide rails substantially coextensive with the length of said frame, a saw carriage guided on said rails for movement longitudinally along the frame, said saw carriage mounting an electric motor and a circular saw blade connected to said motor, said blade having a peripheral portion extending below said frame to cut material arranged beneath said frame, means including an endless chain to advance the saw carriage longitudinally along said rails, a normally open switch on said saw carriage operable to start and stop the motor, and a lever carried on said saw carriage operatively connected with said switch and engageable by said chain to close the switch when the saw carriage is being advanced in a direction to cut said material.

4. In a saw, the combination of a frame, guide rails on said frame, a saw carriage guided on said rails for movement along the frame, said saw carriage mounting an electric motor and a circular saw blade connected to said motor, said blade having a peripheral portion extending below said frame to cut material arranged beneath said frame, means to adjust said saw carriage vertically, an endless chain operable to advance the saw carriage along said rails, a normally open switch on said saw carriage operable to start and stop the motor, and a lever mounted on the carriage and operatively connected with said switch and engageable by said chain to close the switch when the saw carriage is being advanced in a direction to cut said material.

References Cited in the file of this patent

UNITED STATES PATENTS

| 1,522,604 | Torlinski | Jan. 13, 1925 |
| 2,396,961 | Meredith | Mar. 19, 1946 |
| 2,489,420 | Kirk et al. | Nov. 29, 1949 |
| 2,741,277 | Leger | Apr. 10, 1956 |
| 2,785,708 | Krogen | Mar. 19, 1957 |
| 2,818,892 | Price | Jan. 7, 1958 |

FOREIGN PATENTS

| 473,491 | Great Britain | Oct. 14, 1937 |